United States Patent
Koo et al.

(10) Patent No.: US 12,427,999 B2
(45) Date of Patent: Sep. 30, 2025

(54) CONTROLLER FOR PROCESSING IMAGE DATA, IMAGE PROCESSING SYSTEM INCLUDING CONTROLLER, AND METHOD OF OPERATING CONTROLLER

(71) Applicant: Samsung Electronics Co., Ltd., Suwon-si (KR)

(72) Inventors: Sigyoung Koo, Suwon-si (KR); Jungsuk Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 280 days.

(21) Appl. No.: 18/182,082

(22) Filed: Mar. 10, 2023

(65) Prior Publication Data

US 2023/0406326 A1 Dec. 21, 2023

(30) Foreign Application Priority Data

Jun. 14, 2022 (KR) .................. 10-2022-0072241
Aug. 31, 2022 (KR) .................. 10-2022-0109995

(51) Int. Cl.
*B60W 40/105* (2012.01)
*H04L 9/32* (2006.01)

(52) U.S. Cl.
CPC ......... *B60W 40/105* (2013.01); *H04L 9/3247* (2013.01); *B60W 2420/403* (2013.01)

(58) Field of Classification Search
CPC ................................................. B60W 40/105
See application file for complete search history.

(56) References Cited

U.S. PATENT DOCUMENTS

| | | | |
|---|---|---|---|
| 7,930,548 B2* | 4/2011 | Wakao | G06T 1/00 |
| | | | 713/193 |
| 9,306,965 B1 | 4/2016 | Grossman et al. | |
| 9,746,985 B1 | 8/2017 | Humayun et al. | |
| 10,630,699 B2* | 4/2020 | Galula | H04L 63/1416 |
| 11,228,438 B2* | 1/2022 | Shin | G06N 3/08 |
| 11,487,891 B2* | 11/2022 | Njemanze | G06F 21/64 |
| 12,008,379 B2* | 6/2024 | Koo | H04L 9/3271 |
| 2004/0015338 A1 | 1/2004 | Lawrence et al. | |

(Continued)

FOREIGN PATENT DOCUMENTS

| CN | 106170772 A | 11/2016 |
|---|---|---|
| CN | 113836883 A | 12/2021 |

(Continued)

OTHER PUBLICATIONS

Elaine Barker, "Recommendation for Key Management: Part 1—General", Natl. Inst. Stand. Technol. Spec. Publ. 800-57 Part 1 Rev. 5, 171 pages (May 2020), https://doi.org/10.6028/NIST.SP.800-57pt1r5.

*Primary Examiner* — Michael A Berns

(74) *Attorney, Agent, or Firm* — Harness, Dickey & Pierce, P.L.C.

(57) ABSTRACT

A method of operating a controller for processing image data includes receiving, from an image sensor, image data having successive frames and a signature value of the image data, and verifying the signature value using a vehicle speed. The verifying the signature value includes determining a checking period determined according to the vehicle speed, and verifying a signature value of a frame determined from among the successive frames according to the checking period.

19 Claims, 16 Drawing Sheets

(56) References Cited

U.S. PATENT DOCUMENTS

| | | |
|---|---|---|
| 2004/0015737 A1 | 1/2004 | Martin et al. |
| 2004/0103004 A1 | 5/2004 | Wahlbin et al. |
| 2012/0002051 A1 | 1/2012 | Nix |
| 2016/0112443 A1 | 4/2016 | Grossman et al. |
| 2017/0322682 A1 | 11/2017 | Humayun et al. |
| 2018/0224857 A1 | 8/2018 | Yang et al. |
| 2019/0052653 A1 | 2/2019 | Galula et al. |
| 2019/0097805 A1 | 3/2019 | Shin et al. |
| 2022/0114273 A1 | 4/2022 | Njemanze |
| 2023/0406326 A1* | 12/2023 | Koo .................... B60W 40/105 |
| 2024/0056310 A1* | 2/2024 | Mahara .............. H04N 21/8352 |

FOREIGN PATENT DOCUMENTS

| | | |
|---|---|---|
| EP | 3095034 A2 | 11/2016 |
| WO | WO-2016/109005 A2 | 7/2016 |
| WO | WO-2019/035124 A1 | 2/2019 |

* cited by examiner

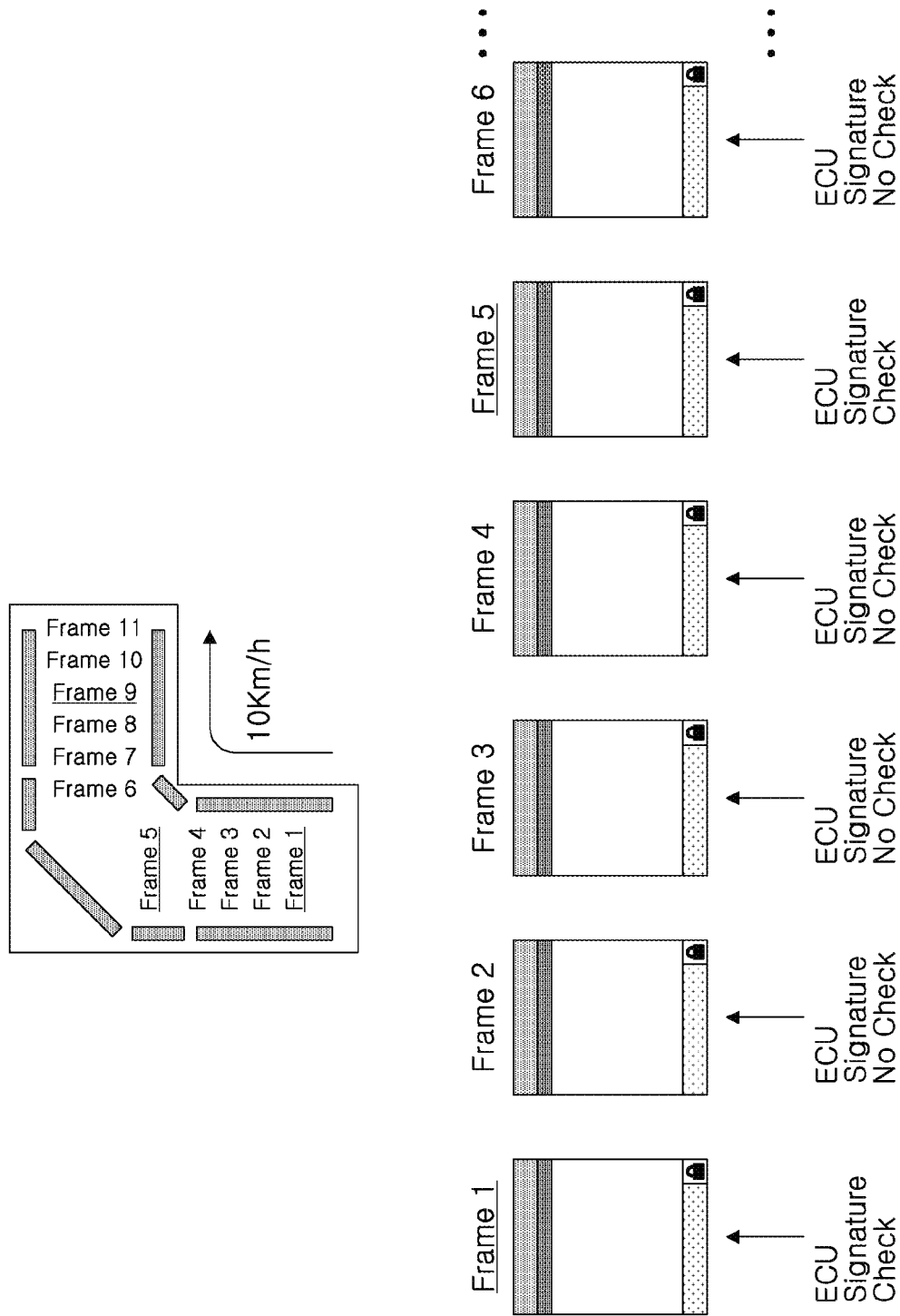

CONTROLLER FOR PROCESSING IMAGE DATA, IMAGE PROCESSING SYSTEM INCLUDING CONTROLLER, AND METHOD OF OPERATING CONTROLLER

CROSS-REFERENCE TO RELATED APPLICATIONS

This application claims benefit of priority to Korean Patent Application No. 10-2022-0072241, filed on Jun. 14, 2022 in the Korean Intellectual Property Office, and Korean Patent Application No. 10-2022-0109995, filed on Aug. 31, 2022 in the Korean Intellectual Property Office, the disclosure of each of which is incorporated herein by reference in its entirety.

BACKGROUND

The present inventive concepts relate to controllers for processing image data, image processing systems including the controllers, and methods of operating the controllers.

An autonomous driving technology, allowing a vehicle to operate autonomously without manipulation of a driver or passenger, has been emerging as a core technology in the future automobile industry. As a basic technology enabling autonomous driving, it is necessary to first develop technologies such as lane recognition using a lidar or CMOS image sensor (CIS), recognition of front, side, and rear vehicles to determine a distance between vehicles, pedestrian recognition, and road environment recognition. To this end, a vehicle senses a current travelling road condition and a driving condition using an in-vehicle sensor, and then transmits relevant information to a main controller in the vehicle. However, in the meantime, when a third party performs hacking and transmits incorrect information to the main controller, the main controller may make an incorrect decision due to the inflow of incorrect information, which is an important issue related to the life of passengers as the information is directly linked in real time to a vehicle traveling at high speed. For example, in a situation in which a camera sensor captures an image of a straight lane on a road, and the sensor transmits information on the image to a main controller of a vehicle, when a third-party hacker intervenes between the sensor and the main controller to manipulate the image such that the lane of the road seems to be a right-turning lane on the road, and transmit the image to the controller, the main controller may control the vehicle to turn right based on incorrect lane information even when the lane is the straight lane, resulting in a serious accident. Thus, there is a need for a technology for ensuring whether a third party intervenes between the sensor and the controller, that is, integrity of sensor information.

SUMMARY

Some example embodiments of the present inventive concepts provide a controller for checking the integrity of image data, an image processing system including the controller, and/or a method of operating the controller.

Some example embodiments of the present inventive concepts provide a controller for checking integrity to optimize power consumption according to vehicle speed, an image processing system including the controller, and/or a method of operating the controller.

According to some example embodiments of the present inventive concepts, a method of operating a controller for processing image data may include receiving, from an image sensor, image data having successive frames and a signature value of the image data, and verifying the signature value using a vehicle speed. The verifying the signature value may include determining a checking period determined according to the vehicle speed, and verifying a signature value of a frame determined from among the successive frames according to the checking period.

According to some example embodiments of the present inventive concepts, a controller for processing image data may include a memory storing a program of instructions and a processor that may be configured to execute the program of instructions to receive speed information from an external sensor and determine a vehicle speed based on the speed information, determine an integrity checking period corresponding to the vehicle speed, and verify integrity of a frame received from an image sensor according to the integrity checking period.

According to some example embodiments of the present inventive concepts, an image processing system may include an image sensor configured to acquire image data, generate a signature value corresponding to the image data, and output the image data and the signature value as secured image data via a first communication interface. The image processing system may further include a controller configured to receive the secured image data from the image sensor, and verify the signature value according to a checking period corresponding to vehicle speed.

According to some example embodiments of the present inventive concepts, a controller, an image processing system including the controller, and a method of operating the controller may implement optimized power consumption by changing the number of times of checking integrity of image data according to speed.

BRIEF DESCRIPTION OF DRAWINGS

The above and other aspects, features, and advantages of the present inventive concepts will be more clearly understood from the following detailed description, taken in conjunction with the accompanying drawings, in which:

FIGS. 6A and 6B are example diagrams illustrating an integrity checking period according to vehicle speed in a general rotation section;

DETAILED DESCRIPTION

Hereinafter, some example embodiments of the present inventive concepts will be described clearly and specifically such that a person skilled in the art easily could carry out example embodiments using the drawings.

As described herein, when an operation is described to be performed "by" performing additional operations, it will be understood that the operation may be performed "based on" the additional operations, which may include performing said additional operations alone or in combination with other further additional operations.

A controller, an image processing system including the controller, and/or a method of operating the controller according to some example embodiments of the present inventive concepts may improve or optimize power consumption, and thus improve operating performance and/or efficiency, of the controller, the image processing system, and/or any device that includes the controller and/or image processing system (e.g., a vehicle, electronic device, computing device, or the like), based on adjusting an interval between check points in time (e.g., checking period) according to vehicle speed when integrity of image data is checked. The controllers according to the present inventive concepts may include (e.g., may be configured to implement, for example via a processor executing a program of instructions stored in a memory) an image integrity checking period controller, a speed determiner, and an image integrity check executor according to speed. The controllers, the image processing systems including the controllers, and the methods of operating the controllers according to some example embodiments of the present inventive concepts may implement improved or optimized power consumption, and thus implement improved operating performance and/or efficiency, of the controller, the image processing system, and/or any device that includes the controller and/or image processing system (e.g., a vehicle, electronic device, computing device, or the like) by differently checking image integrity according to vehicle speed (e.g., checking image integrity according to a checking period that is determined based on the vehicle speed).

Figure 1:
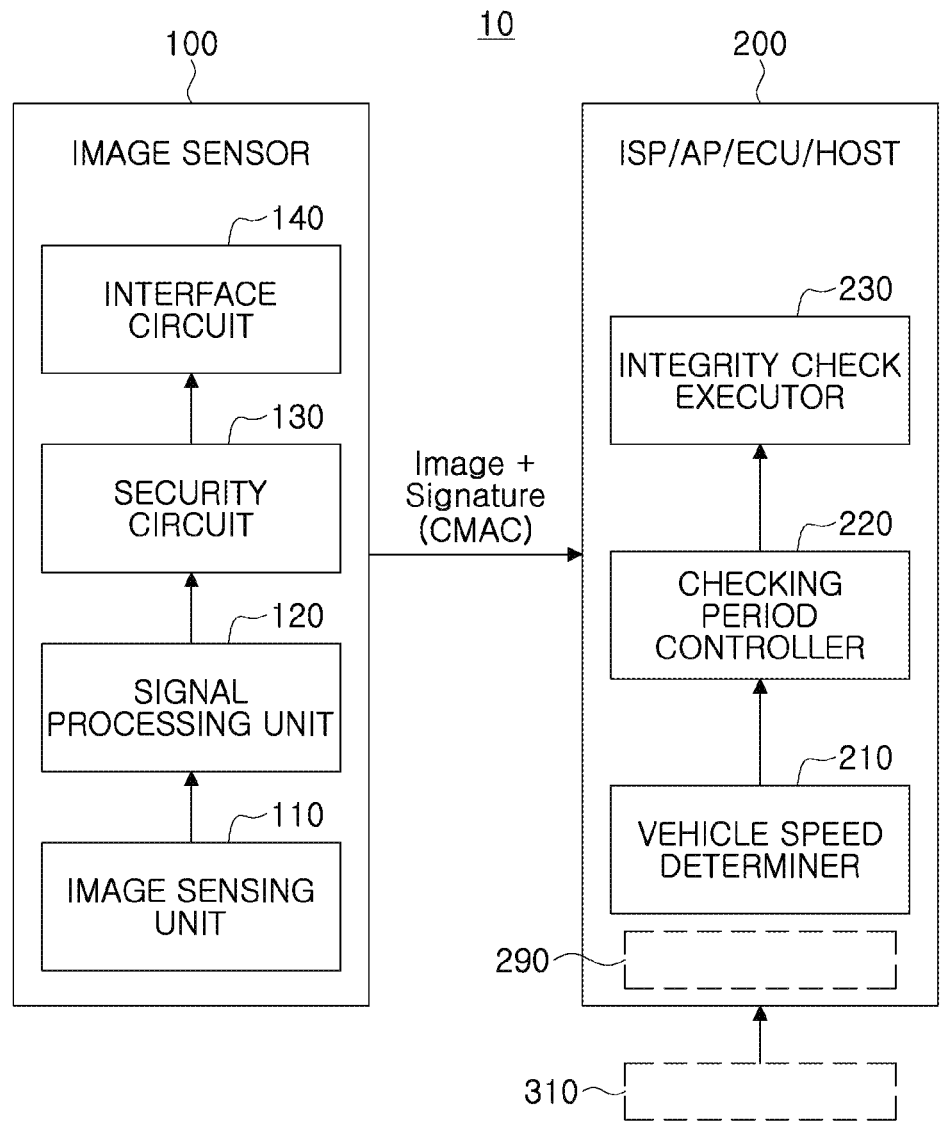
FIG. 1 is an example diagram illustrating an image processing system according to some example embodiments of the present inventive concepts.

FIG. 1 is an example diagram illustrating an image processing system 10 according to some example embodiments of the present inventive concepts. Referring to FIG. 1, the image processing system 10 may include an image sensor 100 and a controller 200 (ISP/AP/ECU/HOST). Here, the image sensor 100 (CIS) may be a camera device performing an imaging operation (e.g., generating an image) using a camera lens. The image processing system 10 may be applied to (e.g., included in) various types of systems. For example, the image processing system 10 may be applied to an autonomous driving system, for example included in a vehicle which may be an autonomous vehicle. Accordingly, in some example embodiments, the image processing system 10, and thus the image sensor 100 and the controller 200, may be included in a device which may be a vehicle (which may be referred to herein interchangeably as an autonomous vehicle). As described herein, a vehicle which may include the image processing system 10 may be and/or include the autonomous vehicle 3000 shown in FIG. 12.

Figure 12:
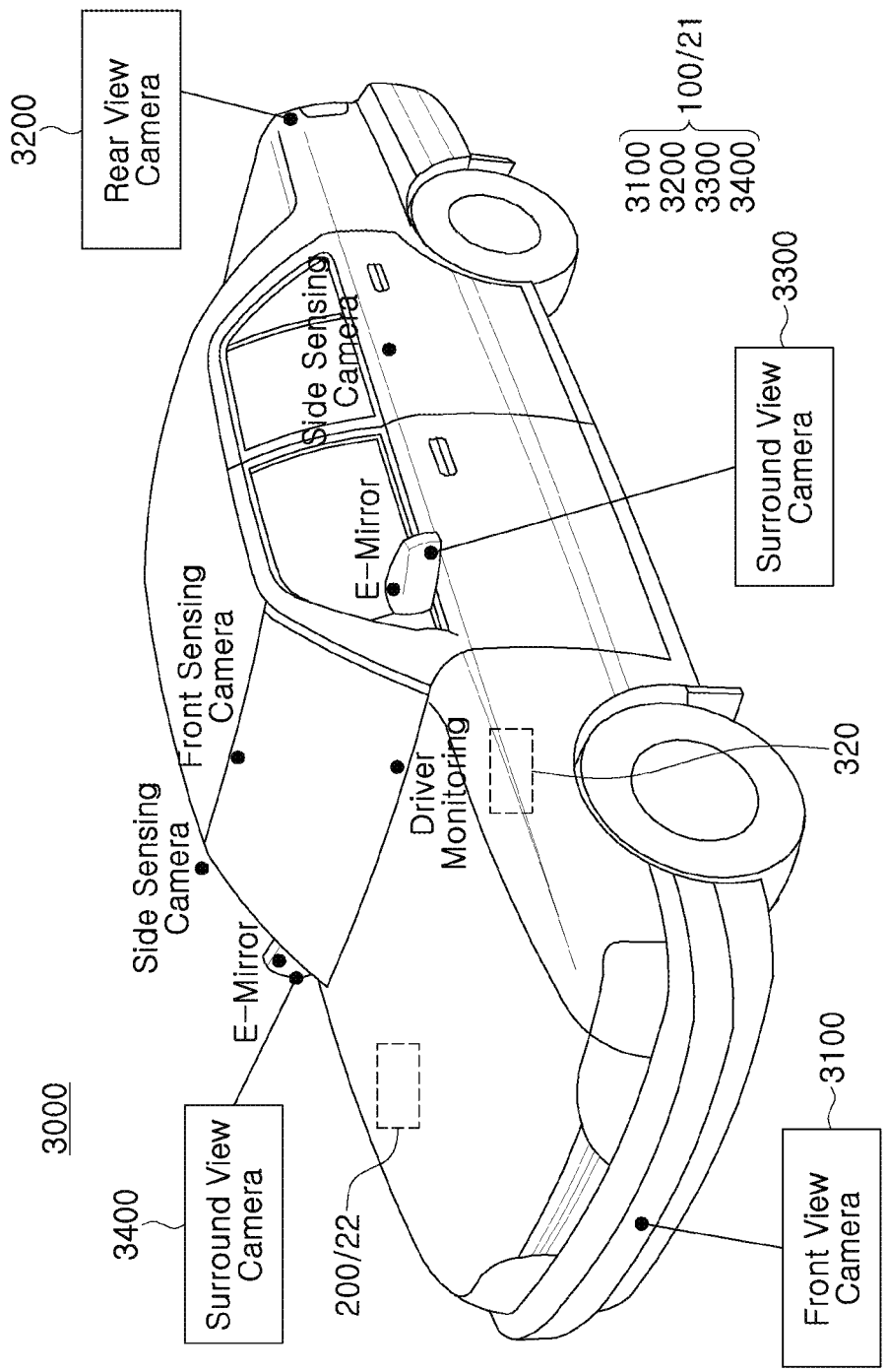
FIG. 12 is a diagram illustrating an autonomous vehicle 3000 according to some example embodiments of the present inventive concepts.

The image sensor 100 (CIS) may be implemented to (e.g., may be configured to) acquire an image from surroundings of the vehicle (e.g., autonomous vehicle 3000 shown in FIG. 12). Restated, an image sensor 100 of an image processing system 10 that is included in a vehicle may be configured to generate an image of at least a portion of an ambient environment that is external to and at least partially surrounds the vehicle. In addition, the image sensor 100 may be implemented to convert the acquired image into a secured image (Image+Signature (CMAC)) ensuring reliability of the acquired image, and to transmit the converted secured image to the controller 200. The controller 200 may adjustably control driving of a vehicle in which the controller is located (e.g., autonomous vehicle 3000), including adjusting steering and/or throttle controls of the vehicle to drive the vehicle through an external ambient environment, based on processing one or more images received from the image sensor 100. In some example embodiments, the secured image may include original image data and a tag (CMAC) for verifying reliability of the original image data. In some example embodiments, the secured image may include an image encrypted based on an encryption algorithm.

The image sensor 100 may include an image sensing unit 110, a signal processing unit 120, a security circuit 130, and an interface circuit 140.

The image sensing unit 110 may be implemented to acquire (e.g., generate) an image using a plurality of pixels. The image sensing unit 110 may include a pixel array implemented as one of an N-type metal-oxide-semiconductor (NMOS) image sensor, a complementary metal-oxide-semiconductor (CMOS) image sensor, or a charge coupled device (CCD) image sensor.

The signal processing unit 120 may be implemented to output (e.g., transmit) image data by processing an image signal acquired from the image sensing unit 110 according to at least one processing method.

The security circuit 130 may be implemented to perform a series of security functions (for example, an authentication operation, a key exchange operation, an encryption/decryption operation, and the like) necessary to convert the acquired image data into a secured image. Here, the security circuit 130 may be implemented in software, hardware, or firmware.

In addition, the security circuit 130 may be implemented to perform an authentication operation with the controller 200. Here, the authentication operation may be performed based on various algorithms. In some example embodiments, with respect to a device authentication operation, an authentication procedure may be performed based on an asymmetric key algorithm such as Rivest Shamir Adleman (RSA), elliptic curve cryptography (ECC), or Diffie-Hellman. In addition, with respect to an image authentication operation, an authentication procedure may be performed based on a symmetric key algorithm such as the advanced encryption standard (AES) or the data encryption standard (DES). In some example embodiments in which a symmetric key for an authentication system based on the symmetric key algorithm is exchanged between a sensor and ISP/AP/ECU/HOST, an asymmetric key authentication method may be performed as a method thereof, and an authentication operation may be started after a setting operation of the image sensor 100. In particular, while the authentication operation is performed, image data and a tag (MAC) acquired from the image sensor 100 may be transmitted to the controller 200. In this case, an image transmitted simultaneously with the authentication operation may not include a tag for reliability verification.

In addition, the security circuit 130 may be implemented to perform a security processing operation on the image data to check whether the image transmitted to the controller 200 is forged or falsified. Here, the security processing operation may generate a tag (CMAC) for the acquired image data.

In some example embodiments, among the security circuits 130, a symmetric key security circuit may generate a tag (CMAC) using image data and information (shared key information) received from an asymmetric key security circuit. Here, the tag (CMAC) may be, for example, a message authentication code (MAC) for all or part of the image data.

In addition, the security circuit 130 may include an encryption module and a DPA defense module. The encryption module may be implemented to perform an encryption operation based on an encryption algorithm or to perform a decryption operation. The DPA defense module may be implemented to defend a DPA attack on the image sensor 100. When security processing operations (an authentication operation, decryption operation, key generation operation, MAC operation, and the like) are performed by the security circuit 130, the DPA defense module may be implemented to reduce direct exposure of a private key using a random number.

The interface circuit 140 may transmit, to the controller 200, a secured image to which the acquired image data and the tag (CMAC) thereof are added according to a particular (or, alternatively, predetermined) interface standard. In some example embodiments, the interface standard may be a mobile industry processor interface (MIPI), an Automotive SerDes Solution (MASS), a DisplayPort, or the like.

The controller 200 (ISP/AP/ECU/HOST) may be implemented to perform an authentication operation with the image sensor 100. The controller 200 may transmit, to the image sensor 100, ciphertext encrypted with a public key of the image sensor 100. Here, the ciphertext may be transmitted via interface standards such as an inter-integrated circuit (I2C), a serial peripheral interface (SPI), a universal asynchronous receiver/transmitter (UART), and an MIPI.

In addition, the controller 200 may be implemented to receive secured image data (IMG and CMAC) transmitted from the image sensor 100, to check integrity of image data therefor, and then to perform a processing operation on the image data. For example, the controller 200 may be implemented as a semiconductor chip implemented separately from the image sensor 100. In some example embodiments, the semiconductor chip may be a system on chip (SoC) in which at least one processor and an image processing module are integrated. For example, the controller 200 may be an advanced driver assistance system (ADAS) SOC which may be configured to at least partially implement autonomous driving of a vehicle in which the image processing system 10 is included (e.g., autonomous vehicle 3000 shown in FIG. 12), including steering and throttle control of the vehicle. In some example embodiments, the controller 200 may calculate a MAC value using the received image data and symmetric key information shared with the image sensor 100 through an asymmetric key encryption method, and may verify integrity of the image data transmitted from the image sensor 100 by comparing the calculated MAC value with a MAC value transmitted from the image sensor 100. The controller 200 may adjustably control driving of a vehicle in which the controller 200 is located (e.g., autonomous vehicle 3000), including adjusting steering and/or throttle controls of the vehicle to drive the vehicle through an external ambient environment, based on processing the image data for which integrity is verified.

The controller 200 may include a vehicle speed determiner 210, a checking period controller 220, and an integrity check executor 230.

The vehicle speed determiner 210 may be implemented to determine a travel direction and travel speed of a vehicle, which may be a vehicle in which the controller 200 and the image sensor 100, and thus the image processing system 10 are included, such as autonomous vehicle 3000 shown in FIG. 12, in real time using speed information corresponding to a vehicle speed sensed by an internal sensor 290 and/or an external sensor 310. The vehicle speed may be a speed at which the vehicle traverses (e.g., travels through) the external, ambient environment at least partially surrounding the vehicle. For example, the vehicle speed determiner 210 may receive, from at least one external speed sensor (e.g., external sensor 310), speed information corresponding to the vehicle speed of the vehicle in which at least the controller 200 and the image sensor 100 are located, and may determine the travel speed of the vehicle in which the controller 200 and the image sensor 100, and thus the image processing system 10, are included in real time. Here, the speed information received from the external speed sensor may be received via at least one other controller (for example, ISP/AP/ECU/HOST). The internal sensor 290 may be internal to the controller 200, the external sensor 310 may be external to the controller 200. The external sensor 310 may be considered to be internal or external to the image processing system 10. The external sensor 310 may be internal to the vehicle in which the controller 200 is included or external to the vehicle. Where the external sensor 310 is external to the vehicle, the external sensor 310 may be understood to be external to the image processing system 10 that is included in the vehicle. In some example embodiments, a speed sensor, such as internal sensor 290 and/or external sensor 310, may be a vehicle speed sensor that is configured to determine a vehicle speed of the vehicle in which the speed sensor is located based on measuring one or more operating properties of the vehicle, including wheel rotational speed of one or more wheels of the vehicle, transmission/transaxle output, or the like.

The checking period controller 220 may be implemented to determine an integrity checking period corresponding to the speed information. In some example embodiments, when the speed information is constant acceleration (e.g., in response to a determination that the speed information indicates a constant, fixed magnitude of acceleration of the vehicle in which at least the controller 200 is included), the integrity checking period may increase or decrease an integrity check according to a travel direction associated with a direction in which the vehicle is travelling through the external, ambient environment. For example, the number (e.g., quantity) of integrity checks when the travel speed of the vehicle is high (e.g., the number of integrity checks performed in response to a determination that the travel speed, or vehicle speed, of the vehicle is high) may be greater than the number of integrity checks when the travel speed of the vehicle is low (e.g., the number of integrity checks performed in response to a determination that the travel speed, or vehicle speed, of the vehicle is low). In some example embodiments, when the speed information is constant speed, the integrity checking period may be implemented to maintain a previous checking period.

The integrity check executor 230 may be implemented to check integrity of image data corresponding to a checking period, for example, a frame. In some example embodiments, the integrity check executor 230 may perform an integrity check per frame when the vehicle speed is greater than or equal to a particular (or, alternatively, predetermined) speed, which may be a reference value of vehicle speed, also referred to as a reference vehicle speed value, a threshold vehicle speed value, or the like. It will be understood that a vehicle speed of a vehicle, particularly as compared to a particular speed, reference value, or the like, may be a value of the vehicle speed, a magnitude of the vehicle speed, the vehicle speed value, or the like. In some example embodiments, the integrity check executor 230 may perform an integrity check per particular (or, alternatively, predetermined) frame when the vehicle speed is less than the particular (or, alternatively, predetermined) speed, which may be the reference value of vehicle speed, also referred to as the reference vehicle speed value, the threshold vehicle speed value, or the like. The integrity check according to the present inventive concepts may be performed according to various checking periods in consideration of the vehicle speed.

Each of the vehicle speed determiner 210, the checking period controller 220, and the integrity check executor 230 may be implemented in hardware, software, or firmware.

The controller 200 may perform communication with an external controller through various communication methods such as a controller area network (CAN), media oriented system transport (MOST), local interconnected network (LIN), FlexRay, Ethernet, and the like. As illustrated in FIG. 1, the image processing system 10 may include one controller 200 and one image sensor 100. However, the image processing system 10 according to the present inventive concepts may be implemented in various other forms. The image processing system 10 according to the present inventive concepts may be implemented by combining the number of controllers or the number (e.g., quantity) of image sensors in various manners.

In addition, the controller 200 may analyze numerous images received from each image sensor 100 (e.g., camera sensor), interpret a current state of the external ambient environment (e.g., interpret a current traffic condition and an obstacle in the external ambient environment) based thereon, and then execute device control for a subsequent operation in real time. Such device control may include the controller 200 adjustably controlling one or more driving controls 320 as shown in FIG. 12 (e.g., steering control, brake control, throttle control, etc.) of a vehicle in which the controller 200 is located (e.g., autonomous vehicle 3000), to drive the vehicle through the external ambient environment, based on processing the image data of at least a portion of the external ambient environment for which integrity is verified. At the same time, the controller 200 may perform a security processing operation to check whether an image is transmitted from a legitimate camera device and whether forgery/falsification does not occur during transmission of the image, thereby improving the reliability and safety of such device control (e.g., vehicle driving) that is implemented by at least the controller 200 based on analyzing image data (e.g., one or more images) received from the image sensor based on ensuring that such control is based on verified images due to verifying a signature value of the image data.

The controller 200 may include a security module (for example, a hardware security module (HSM)) performing the above-described security function. Here, the security module may be implemented in software, hardware, or firmware. In general, the security module (HSM) may refer to a cryptographic processor designed specifically for protection of a lifecycle of a cryptographic key. The HSM may perform cryptographic processing, key protection and key management within a hardened anti-forgery device. The HSM used in a vehicle controller domain may include a secure memory capable of safely storing a key, for example, a high-security dedicated HSM random access memory (RAM) or read only memory (ROM), independently of a host system. The HSM may perform a series of operations via a dedicated a central processing unit (CPU), thereby performing a function relatively safely from an attack by a potential attacker.

A general image processing system may perform an image integrity check at regular intervals or per frame. Accordingly, a typical image processing system 10 (e.g., at least the controller 200 thereof) may exhibit a fixed power consumption by at least a portion of the image processing system 10 (e.g., at least the controller 200) when checking image integrity. In general, the image integrity check may be performed at a fixed interval or per frame, such that power may be consumed at low speed (e.g., low rate of electrical power consumption by at least the controller 200) based on high speed (e.g., high vehicle speed). For example, the image processing system 10, including the controller 200 thereof, in a vehicle may be configured to perform the image integrity check of image data received from an image sensor 100 at a fixed interval (e.g., fixed frequency) or per frame that is configured (e.g., optimized) for high vehicle speed of the vehicle, even if the vehicle is moving at a low vehicle speed. In addition, when the fixed interval is increased (e.g., increased in frequency), there is an advantage in that an amount of power is consumed by at least the controller 200 to support performing at least a portion of the image integrity check based on low speed (e.g., low vehicle speed of the vehicle that includes at least the controller 200 of the image processing system 10 and thus a low vehicle speed associated with the images generated by the image sensor 100). However, integrity of an image frame may not be ensured at high speed (e.g., high vehicle speed of the vehicle that includes at least the controller 200 of the image processing system 10 and thus a low vehicle speed associated with the images generated by the image sensor 100).

Conversely, the image processing system 10 according to some example embodiments of the present inventive concepts may include the controller 200 changing an integrity checking period according to vehicle speed (e.g., vehicle speed of the vehicle that includes the image processing system 10 and thus a vehicle speed associated with the images generated by the image sensor 100), thereby implementing improved or optimal power consumption of the image processing system 10 and/or any portion thereof (e.g., the controller 200) while checking integrity regardless of the vehicle speed. That is, the integrity of the image frame may be checked in consideration of the vehicle speed. For high vehicle speed, no frame may miss the integrity check. For slow vehicle speed, improved or optimal power consumption by the image processing system 10 and/or any portion thereof (e.g., the controller 200) may be implemented, for example upon at least some frames being permitted to miss the integrity check.

The image processing system 10 according to some example embodiments of the present inventive concepts may not perform an integrity check, that is, a signature check, on a frame-by-frame basis in consideration of a resource issue. For example, the image processing system 10 and/or any portion thereof (e.g., the controller 200) may be configured to selectively refrain from performing an integrity check on a frame-by-frame basis, and/or perform the integrity check at a lower frequency (e.g., every other frame, every two frames, every five frames, etc.) based on the vehicle speed of a vehicle in which the image processing system 10 and/or any portion thereof (e.g., the image sensor 100 and/or the controller 200) is included (e.g., based on a checking period that is determined based on the vehicle speed), thereby improving or optimizing power consumption by the image processing system 10 without affecting the reliability and safety of driving control implemented based on the image data (e.g., driving control of the vehicle at least partially implemented by the controller 200 based on the image data).

Figure 2A:
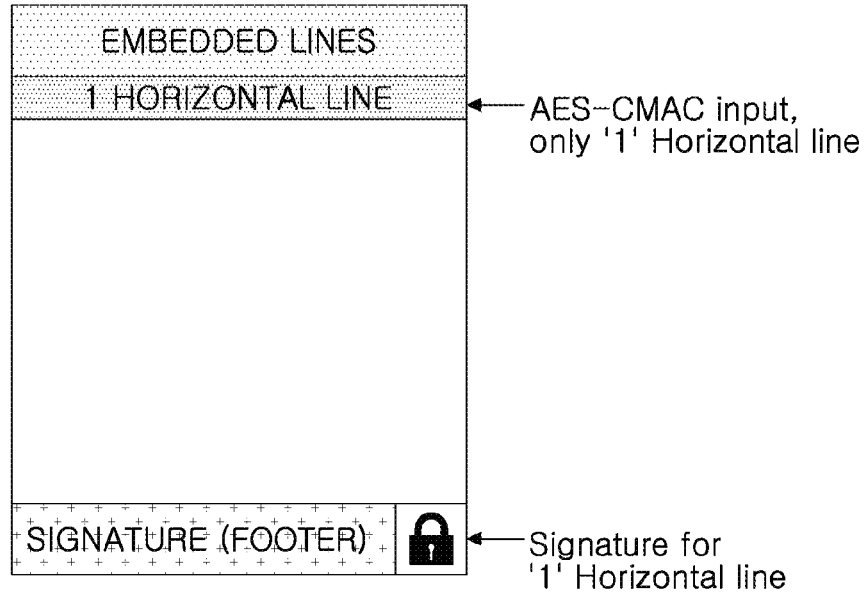
FIGS. 2A and 2B are diagrams illustrating some example embodiments in which a frame signature is implemented in an image sensor 100 according to some example embodiments of the present inventive concepts.
Figure 2B:
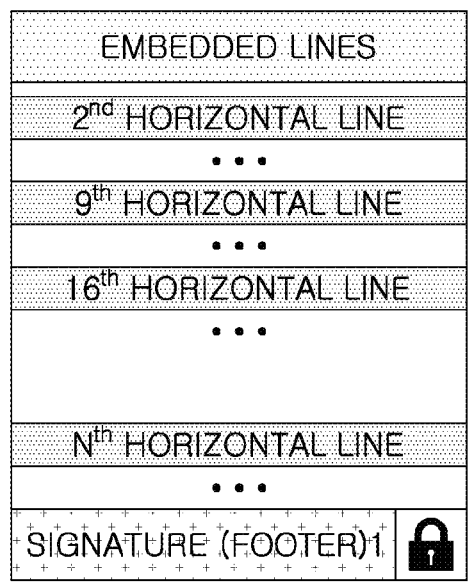

FIGS. 2A and 2B are diagrams illustrating some example embodiments in which a frame signature is implemented in the image sensor 100 according to some example embodiments of the present inventive concepts.

Referring to FIG. 2A, image-related information transmitted to ISP/AP/ECU/HOST (referred to herein interchangeably as the controller 200 shown in FIG. 1), for example image-related information transmitted by the image sensor 100, may include embedded lines including various types of information in a sensor, and a footer. The CMAC code may be included in a specific region in the footer. A signature of a frame may be performed by selecting a signature target with respect to corresponding information, for example, embedded lines+image frame, only the image frame itself, or embedded lines+image frame+footer in various manners. An in-frame image signature method is not limited to performing a signature for a first horizontal line, as illustrated in FIG. 2A. A frame signature method according to the present inventive concepts may include selecting a starting horizontal line. In addition, the frame signature method according to the present inventive concepts may include performing a signature for a plurality of horizontal lines. In addition, the frame signature method according to the present inventive concepts may limit the number of total horizontal lines to be signed.

Referring to FIG. 2B, it is illustrated that a signature is started from a second horizontal line in one frame, a signature is performed per seven horizontal lines, and a signature for all N horizontal lines is performed (N being any positive integer, for example, an integer equal to or greater than 16).

As can be inferred from FIGS. 2A and 2B, in the frame signature method according to the present inventive concepts, a starting horizontal line, an interval between horizontal lines to be signed, and the total number of horizontal lines to be signed may be freely selected. The frame signature method may be determined by the controller 200 of the image processing system 10 (see FIG. 1), after (e.g., subsequently to) the image sensor 100 of the image processing system 10 is reset. The controller 200 may encrypt information (e.g., setting information) corresponding to the determined signature method, and may transmit an encrypted code (e.g., encrypted setting information) to the image sensor 100. The image sensor 100 may decrypt the encrypted code to check the frame signature method, and perform frame signature according to the checked frame signature method.

For example, frame signature information according to a first example embodiment may include information indicating that a signature is started from a first horizontal line, a signature is performed per ten horizontal lines, and the number of all horizontal lines to be signed is one. Frame signature information according to a second example embodiment may include information indicating that a signature is started from a 230-th horizontal line, the signature is performed per ten horizontal lines, and the total number of horizontal lines to be signed is one. Frame signature information according to a third example embodiment may include information indicating that a signature is started from a 1112-th horizontal line, the signature is performed per ten horizontal lines, and the total number of horizontal lines to be signed is one.

An integrity check operation of the controller 200 according to some example embodiments of the present inventive concepts may be performed per frame or sporadically.

Figure 3:
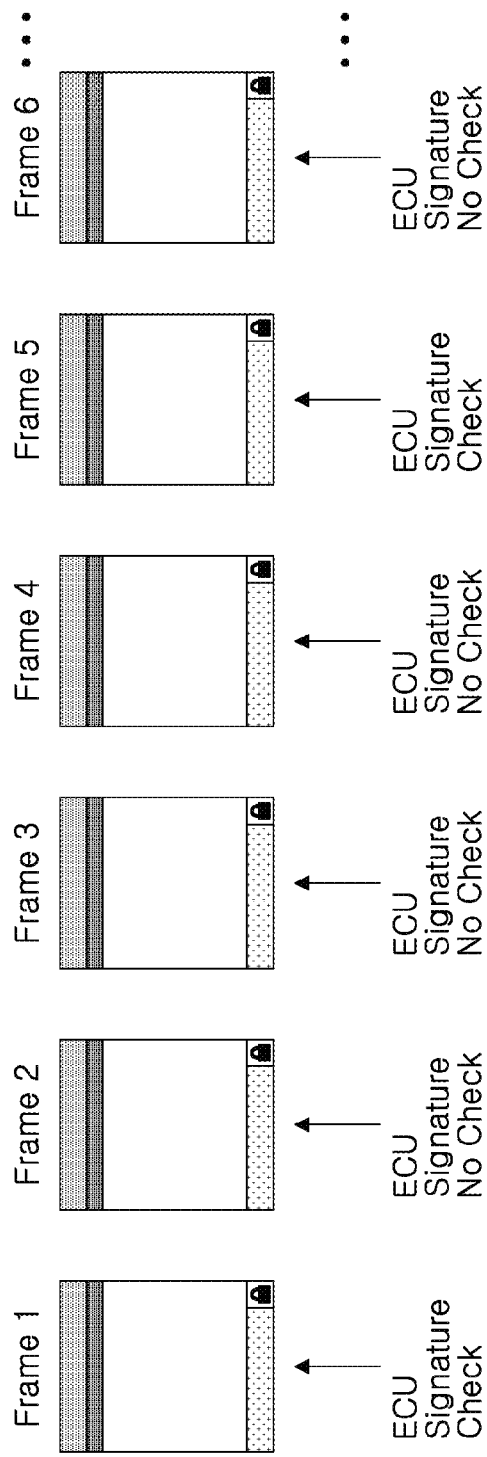
FIG. 3 is a diagram illustrating an integrity check of a controller 200 according to some example embodiments of the present inventive concepts.

FIG. 3 is a diagram illustrating an integrity check of the controller 200 according to some example embodiments of the present inventive concepts. Referring to FIG. 3, the controller 200 may perform a signature check on a first frame, and then may perform the signature check on a fifth frame without performing the signature check on second to fourth frames. That is, the signature check may be performed per four frames starting from the first frame.

A signature check method according to the present inventive concepts may be performed in the form of an arithmetic sequence, but it should be understood that the present inventive concepts are not limited thereto. It should be understood that the signature check method according to the present inventive concepts is not fixed, but may be changed. For example, a signature check point in time and check frame selection method according to the present inventive concepts may be changed to a method of optimizing power consumption according to vehicle speed.

A general controller may check image integrity at regular intervals or per frame, regardless of vehicle speed. In this case, the vehicle speed may not be considered (e.g., may be disregarded), such that a relatively large amount of power is consumed by at least a portion of the image processing system 10 (e.g., at least the controller 200 thereof) at low speed (e.g., when the vehicle including the image processing system 10 is travelling at a low vehicle speed). Alternatively, when an integrity check interval is widened in consideration of power consumption based on low speed of the vehicle, information on a changed road may not be checked as the image integrity interval is widened at high speed of the vehicle. Thus, an image change by a third party may be highly likely to be intervened between frames received at least at the controller 200. The image change by the third party may not be checked on a frame-by-frame basis. Conversely, the controller 200 according to some example embodiments of the present inventive concepts may adjust an image integrity check interval according to the vehicle speed of the vehicle in which at least the controller 200 of the image processing system is included, thereby improving or optimizing overall power consumption of a system (e.g., the image processing system 10 and/or any portion thereof, including for example the controller 200) while ensuring an image integrity check reflecting road change information according to the high speed of the vehicle and thereby, in some example embodiments, ensuring reliable and safe operation (e.g., driving) of the vehicle based on image data received at the controller 200.

Figure 4A:
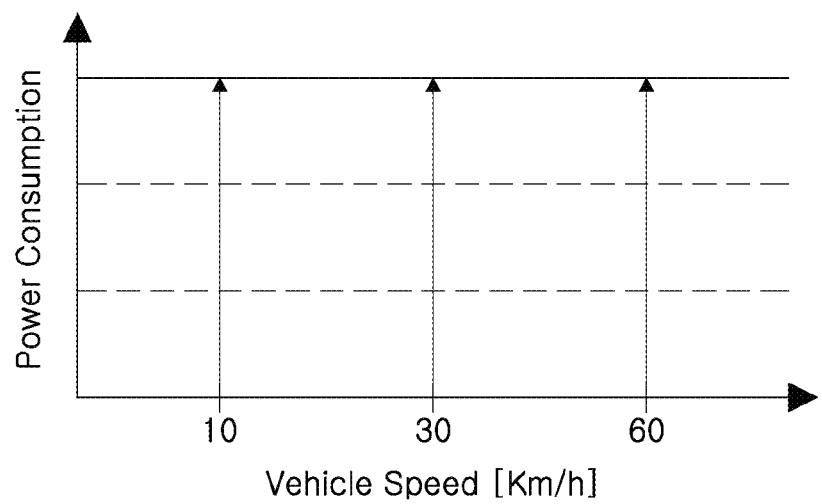
FIGS. 4A and 4B are example diagrams illustrating power consumption according to an integrity checking method.
Figure 4B:
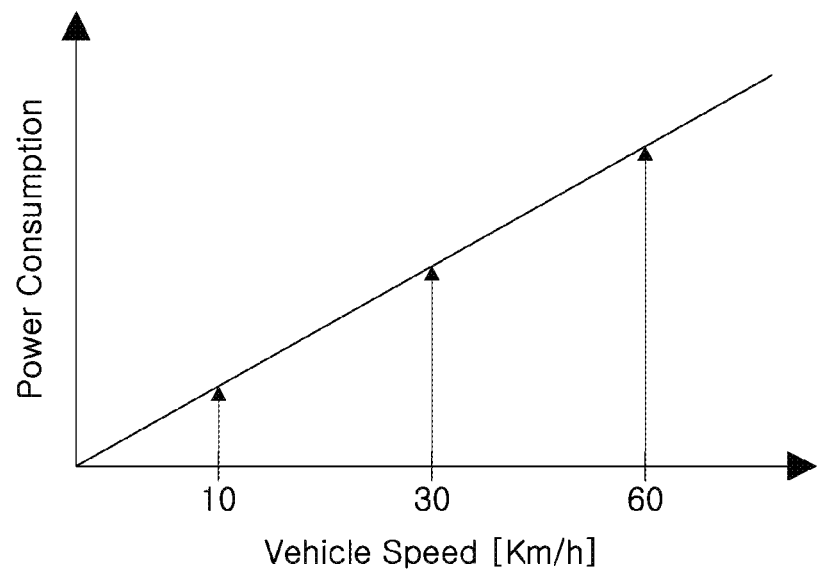

FIGS. 4A and 4B are example diagrams illustrating power consumption of (e.g., power consumption by) at least a portion of an image processing system 10 (e.g., the controller 200 thereof) included in a vehicle travelling at various vehicle speeds according to an integrity checking method. Referring to FIG. 4A, an image integrity checking method at regular intervals or per frame, of successive frames of images generated by an image sensor 100 of the image processing system 10 included in the vehicle and transmitted to the controller 200 thereof, regardless of vehicle speed of the vehicle may consume maximum power (e.g., at least the controller 200 may consume a maximum amount or rate of power) all the time regardless of speed (e.g., regardless, or independently, of vehicle speed of the vehicle that includes the image processing system 10). Conversely, referring to FIG. 4B according to some example embodiments of the inventive concepts, when vehicle speed is low (e.g., in response to a first determination that the vehicle speed is low, less than a reference value, such as 30 Km/h, which may be stored at the image processing system 10 such as in a memory of processing circuitry of the controller 200, or the like), an image check interval may be wider (e.g., may be caused to be wider by the controller 200 in response to such first determination), and a small amount of power may be consumed by at least a portion of the image processing system 10 (e.g., the controller 200 thereof) included in the vehicle. When the vehicle speed is high (e.g., in response to a second determination that the vehicle speed is high, equal to or greater than a reference value, such as 30 Km/h, which may be stored at the image processing system 10 such as in a memory of processing circuitry of the controller 200, or the like), the image check interval may be narrower (e.g., may be caused to be wider by the controller 200 in response to such second determination), such that a larger amount of power than that of the low vehicle speed may be consumed by at least a portion of the image processing system 10 (e.g., the controller 200 thereof) included in the vehicle, and validity of image integrity may be ensured. As a result, power consumption by at least a portion of the image processing system 10 (e.g., the controller 200 thereof) included in the vehicle may be improved and/or optimized in accordance with (e.g., based on) the vehicle speed without compromising validity of image integrity and thus ensuring safe and reliable operation (e.g., driving) of a vehicle based on operation of the image processing system 10 while improving or optimizing power consumption (and thus improving efficiency, performance, and/or functionality) of at least the controller 200, the image processing system 10, and/or the vehicle including the image processing system 10.

Figure 5A:
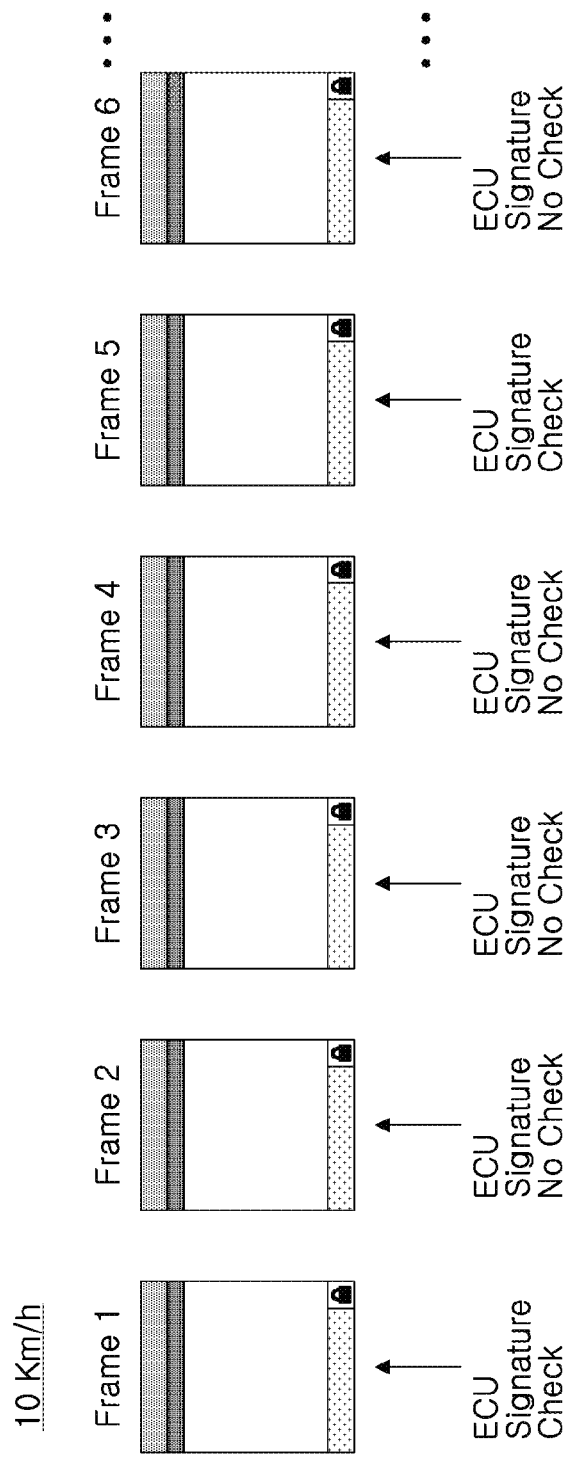
FIGS. 5A, 5B, and 5C are example diagrams illustrating an integrity check interval according to vehicle speed according to some example embodiments of the present inventive concepts.
Figure 5B:
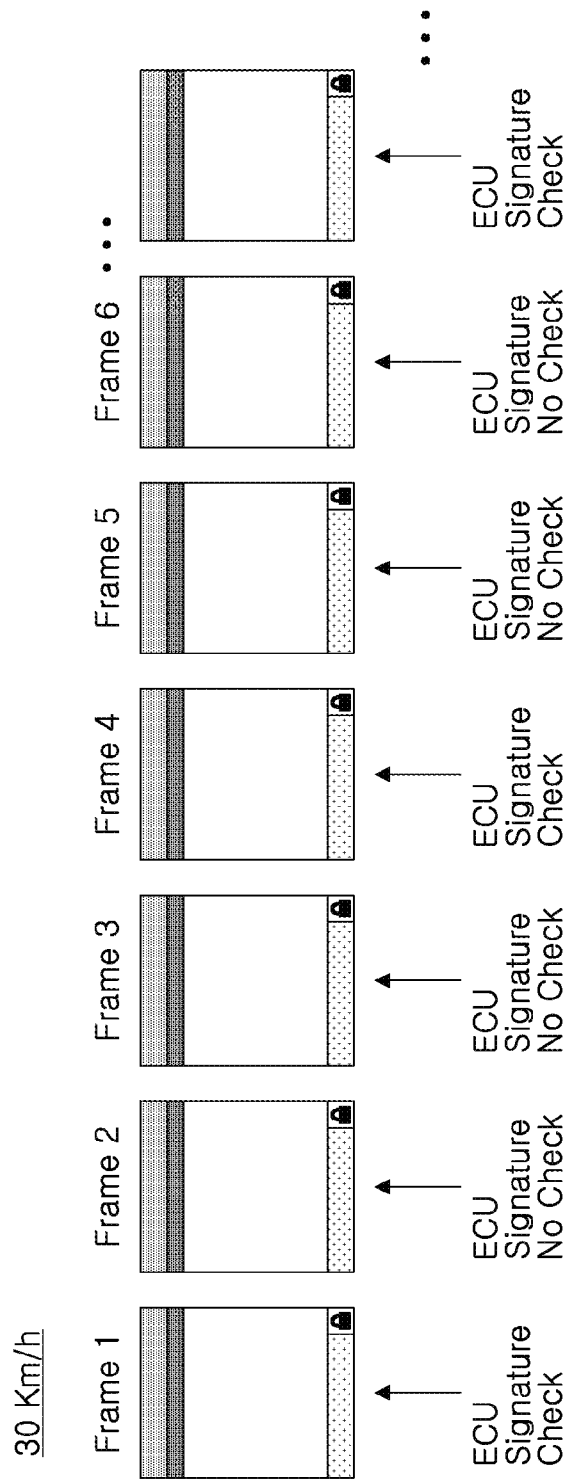
Figure 5C:
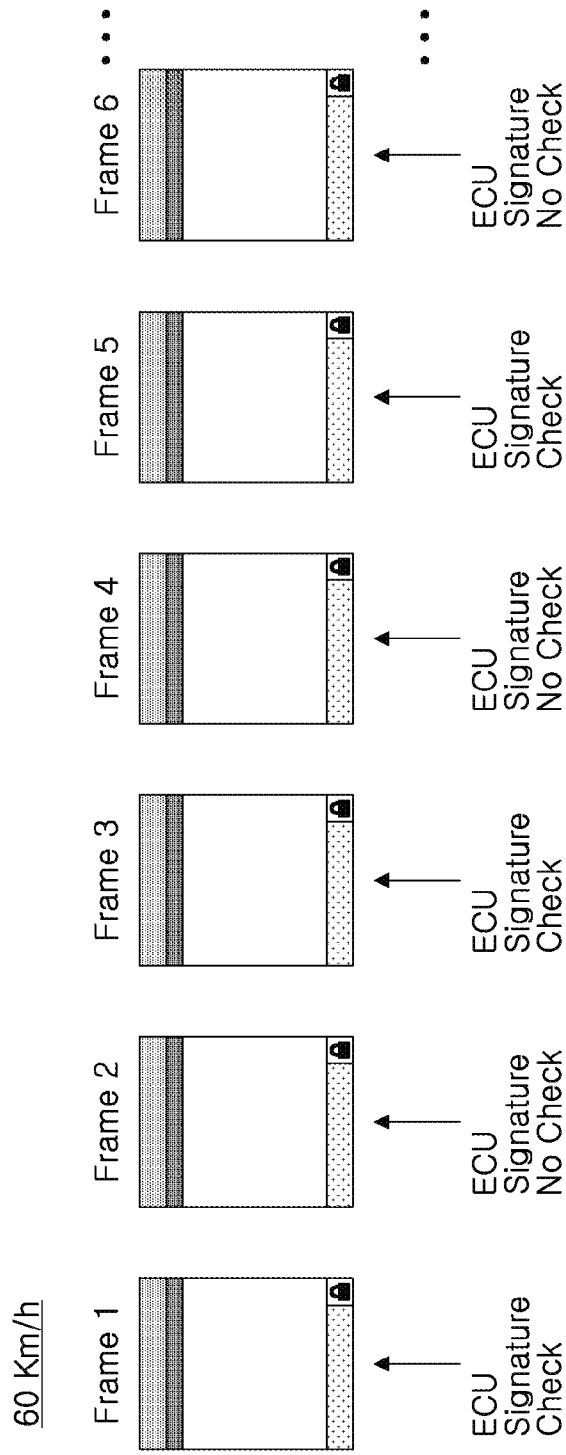

FIGS. 5A, 5B, and 5C are example diagrams illustrating an integrity check interval according to vehicle speed according to some example embodiments of the present inventive concepts. The integrity check interval illustrated in FIG. 5A is illustrated at 10 Km/h illustrated in FIG. 4B, and the integrity check interval illustrated in FIG. 5B is illustrated at 30 Km/h illustrated in FIG. 4B, and the integrity check interval illustrated in FIG. 5C is illustrated at 60 Km/h illustrated in FIG. 4B. Referring to FIG. 5A, when vehicle speed is 10 Km/h, an integrity check may be performed per 4-frame. Referring to FIG. 5B, when the vehicle speed is 30 Km/h, the integrity check may be performed per 3-frame. Referring to FIG. 5C, when the vehicle speed is 60 Km/h, the integrity check may be performed per 2-frame.

The integrity check interval according to some example embodiments of the present inventive concepts may be changed according to vehicle speed of the vehicle including the image processing system 10 that includes a controller 200 which may be at least partially performing the integrity checks shown in FIGS. 5A to 5C. For example, the higher the vehicle speed of the vehicle, the narrower the integrity check interval caused by the controller 200 based on the determined vehicle speed, and the slower the vehicle speed of the vehicle, the wider the integrity check interval caused by the controller 200 based on the determined vehicle speed. The speed and integrity check points in time illustrated in FIGS. 5A, 5B and 5C are merely example values for describing some example embodiments of the inventive concepts. In some example embodiments, a vehicle speed and an integrity check point in time may be accurately measured in advance and a correlation therebetween may be analyzed, and then an integrity check point in time for each speed to be finally applied may be determined.

Figure 6A:
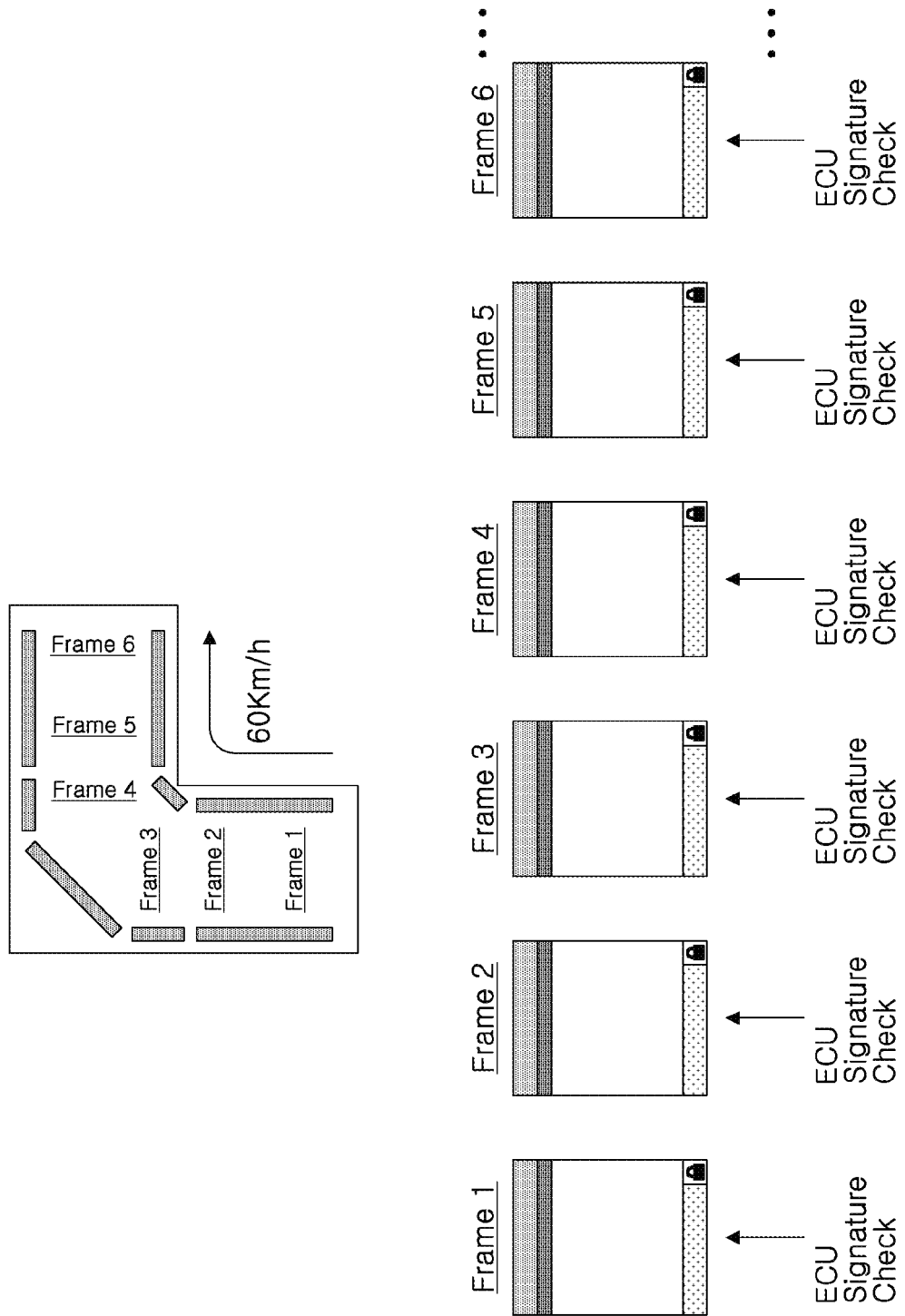

FIGS. 6A and 6B are example diagrams illustrating an integrity checking period according to vehicle speed in a rotation section according to some example embodiments of the present inventive concepts.

Referring to FIG. 6A, when a vehicle travels at 60 Km/h in a right turn section, an integrity check may be performed per frame by at least a portion of an image processing system 10 (e.g., at least a controller 200) included in the vehicle. When the vehicle speed of the vehicle is high at 60 Km/h (e.g., greater than a threshold vehicle speed value of 30 Km/h, on a curved road, the controller 200 may process images per frame in order to be aware that the road is curved in frames 3 and 4, thereby recognizing that the road is curved in frames 3 and 4, for example to enable vehicle control (e.g., driving) by the controller 200 based on the processed image data. Accordingly, the processing of whether an image is hacked may also be performed on a frame-by-frame basis. In this case, for ease of description, it is assumed that power consumption for a system (e.g., power consumption by at least a portion of the image processing system 10, including for example power consumption by the controller 200) to perform a signature check on a frame-by-frame basis is 200 mA.

Referring to FIG. 6B, when a vehicle travels at 10 Km/h in a right turn section (e.g., in response to a determination, for example at the controller 200 of the image processing system included in the vehicle, that the vehicle speed of the vehicle is 10 Km/h), an integrity check may be performed per 4-frame. In the same manner as in FIG. 6A above, the integrity check may be performed per frame. However, since vehicle speed is slow (e.g., below a threshold vehicle speed of 30 Km/h), more frames may be processed per unit time. For example, when the vehicle speed is 10 Km/h (e.g., in response to a determination, for example at the controller 200 of the image processing system 10 included in the vehicle, that the vehicle speed of the vehicle is 10 Km/h), the controller 200 may perform an image integrity check only at ¼ intervals in preparation for high speed. Accordingly, power consumption (e.g., power consumption by at least a portion of the image processing system 10, including for example power consumption by the controller 200) may be 50 mA reduced by ¼ in preparation for high speed. The integrity check may also need to be processed on a frame-by-frame basis, and thus power consumed for such processing may also be 200 mA in the same manner as in FIG. 6A. However, when the vehicle speed is slow according to the present inventive concepts, power consumed (e.g., power consumed by at least a portion of the image processing system including for example power consumption by the controller 200) when the image integrity check is performed only at ¼ intervals may be 50 mA, ¼ of 200 mA, by simple arithmetic calculation, thereby improving (e.g., reducing) or optimizing power consumption by at least a portion of the image processing system 10, including for example power consumption by the controller 200. The numerical values of 10 Km/h, 200 mA, ¼, 50 mA, and the like described in the above example are given as examples for description. In some example embodiments, power consumption (e.g., power consumption by at least a portion of the image processing system 10, including for example power consumption by the controller 200) caused by a variable integrity check point in time may be checked by precise measurement.

Figure 7:
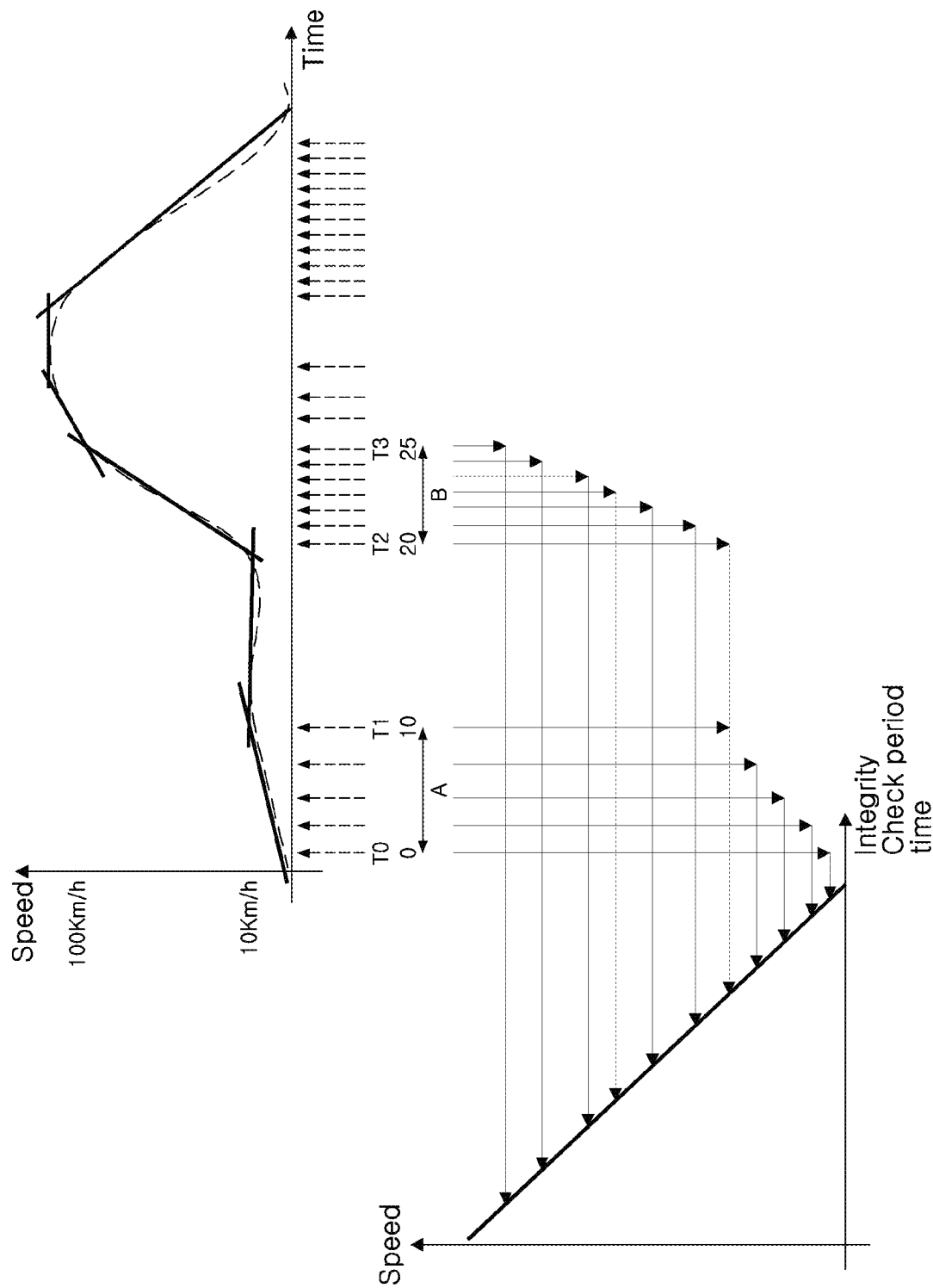
FIG. 7 is an example diagram illustrating a method of determining an integrity check point in time and period according to vehicle speed of a controller 200 according to some example embodiments of the present inventive concepts.

FIG. 7 is an example diagram illustrating a method of determining an integrity check point in time and period according to vehicle speed of the controller 200 according to some example embodiments of the present inventive concepts;

In general, an image integrity period value may be determined at a point in time at which vehicle speed of a vehicle including the image processing system 10 is changed. Referring to FIG. 7, a solid line indicates a vehicle speed of the vehicle, and a dotted arrow indicates a determination point in time. In some example embodiments, when (e.g., in response to a determination that) the vehicle speed is changed to be high (e.g., equal to or greater than a reference value), the integrity checking period may be determined to have a higher value. When (e.g., in response to a determination that) the vehicle speed is changed to be low (e.g., less than a reference value), the integrity checking period may be determined to have a low value that is smaller than the higher value of the integrity checking period. In addition, when the vehicle speed is not changed over a period of time, a final integrity checking period value may be maintained.

As illustrated in FIG. 7, image data integrity check control time may be determined at a ratio of once per unit time in section A and at a ratio of 18 times per unit time in section B. For example, an integrity checking period of section A may be (10 Km/h–0 Km/h)/(0 s–0 s)=10/10=1. An integrity checking period of section B may be (100 Km/h–10 Km/h)/(25 s–20 s)=90/5=18. In this case, an integrity checking period value according to vehicle speed may also be set to an appropriate value.

Figure 8:
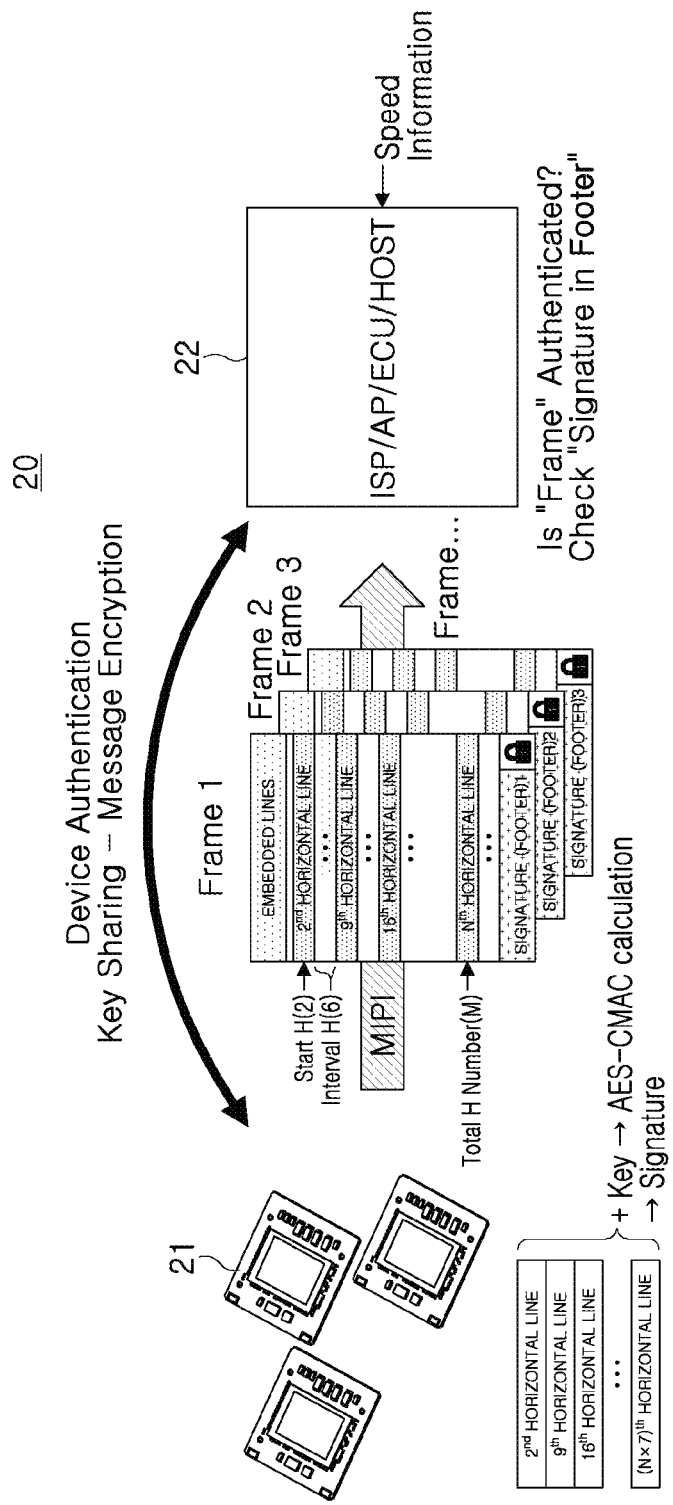
FIG. 8 is an example diagram illustrating an integrity check process of a vehicle control system 20 according to some example embodiments of the present inventive concepts.

FIG. 8 is an example diagram illustrating an integrity check process of a vehicle control system 20 according to some example embodiments of the present inventive concepts. Referring to FIG. 8, the vehicle control system 20 may include at least one sensor 21 and a controller 22 (ISP/AP/ECU/HOST). As described herein, the vehicle control system 20 may be included in a vehicle, which may be and/or include the autonomous vehicle 3000 shown in FIG. 12.

As illustrated in FIG. 8, the sensor 21 may calculate and sign AES-CMAC using a security key with respect to each of all M horizontal lines per six horizontal lines in each frame, starting from a second frame. Here, the security key may be key information shared with the controller 22. In some example embodiments, the key information may be 112 bits or more.

In some example embodiments, the sensor 21 may transmit a plurality of frames to the controller 22 according to an MIPI interface. Here, each frame may include signatures for all M horizontal lines per six horizontal lines, starting from the second frame.

The controller 22 may receive vehicle speed information via wired/wireless communication with an external device. The controller 22 may determine an integrity checking period according to vehicle speed. Here, the integrity checking period may be acquired using a mapping table or a conversion equation. In some example embodiments, the controller 22 may transmit, to the sensor 21, sensor setting information on (e.g., sensor setting information associated with) a frame to which image signature data is added via an I2C interface. Transmission of such setting information may be omitted. The controller 22 may proceed with image integrity signature information on the frame transmitted from the sensor 21 according to the integrity checking period. In addition, the controller 22 may analyze numerous images received from each sensor 21 to determine a state of the external ambient environment (e.g., interpret a current traffic condition and an obstacle based thereon), and then execute device control for a subsequent operation in real time. Such device control may include the controller 22 adjustably controlling one or more driving controls 320 as shown in FIG. 12 (e.g., steering control, brake control, throttle control, etc.) of a vehicle in which the controller 22 is located (e.g., autonomous vehicle 3000), to drive the vehicle through an external ambient environment, based on processing the image data for which integrity is verified.

Figure 9:
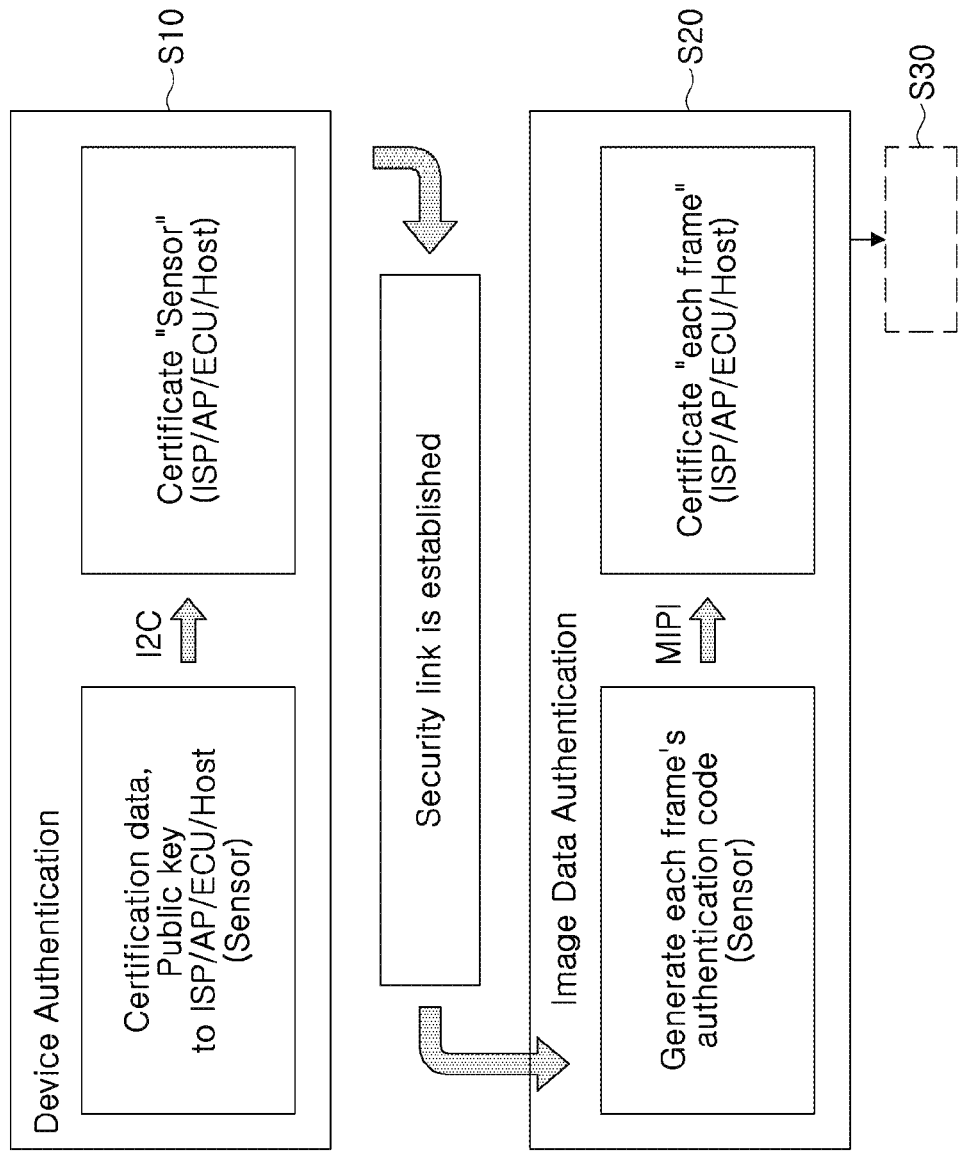
FIG. 9 is an example diagram illustrating an operation of a vehicle control system 20 according to some example embodiments of the present inventive concepts.

FIG. 9 is an example diagram illustrating an operation of the vehicle control system 20 according to some example embodiments of the present inventive concepts. Referring to FIG. 9, the vehicle control system 20 may perform device authentication (S10) and perform image data authentication (S20) and may further perform vehicle control (S30).

The device authentication may be performed only once after reset. The device authentication may be performed as follows. The sensor 21 may transmit certification data and a public key to the controller 22. The controller 22 may receive the certification data and the public key from the sensor 21, and the controller 22 may authenticate the sensor 21 using an encryption algorithm. Here, the encryption algorithm may be an RSA encryption algorithm. A secure link may be established between the sensor 21 and the controller 22 (S10).

Thereafter, the image data authentication may be performed. The sensor 21 may generate an authentication code of a frame based on an advanced encryption standard-cipher-based message authentication code (AES-CMAC) algorithm. Frames having an authentication code may be output to the controller 22 via the MIPI interface. The controller 22 may check an authentication code per each frame or per each particular (or, alternatively, predetermined) frame (S20).

At S30, the controller 22 may analyze the image data that is authenticated at S20 to determine a state of the external ambient environment that is external to the vehicle (e.g., interpret a current traffic condition and an obstacle based thereon), and then execute device control for a subsequent operation (e.g., driving operation) in real time. Such device control may include the controller 22 adjustably controlling one or more driving controls 320 as shown in FIG. 12 (e.g., steering control, brake control, throttle control, etc.) of a vehicle in which the controller 22 is located (e.g., autonomous vehicle 3000), to drive the vehicle through an external ambient environment, based on processing the image data for which integrity is verified.

Figure 10:
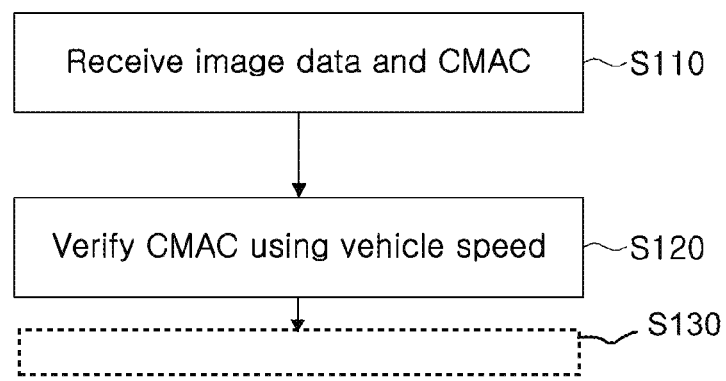
FIG. 10 is an example flowchart illustrating a method of operating a controller according to some example embodiments of the present inventive concepts.

FIG. 10 is an example flowchart illustrating a method of operating a controller according to some example embodiments of the present inventive concepts. Referring to FIGS. 1 to 10, a method of operating the controller 200 may be performed as follows. The controller 200 may receive, from the image sensor 100, a plurality of frames having image data and a signature value (CMAC) (S110). The controller 200 may verify the signature value (CMAC) according to a particular (or, alternatively, predetermined) integrity checking period among a plurality of frames using vehicle speed (S120). At S130, the controller 200 may analyze the image data for which signature values are verified at S120 to determine a state of the external ambient environment that is external to the vehicle (e.g., interpret a current traffic condition and an obstacle based thereon), and then execute device control for a subsequent operation (e.g., driving operation) in real time. Such device control may include the controller 200 adjustably controlling one or more driving controls 320 as shown in FIG. 12 (e.g., steering control, brake control, throttle control, etc.) of a vehicle in which the controller 200 is located (e.g., autonomous vehicle 3000), to drive the vehicle through an external ambient environment, based on processing the image data for which integrity is verified.

In some example embodiments, the signature value (CMAC) may be generated in the image sensor 100 to correspond to each of frames. In some example embodiments, the controller 200 may encrypt setting information for generating the signature value (CMAC) in each frame, and the encrypted information may be transmitted to the image sensor 100. In some example embodiments, the controller 200 may receive speed information from an external sensor, and the controller 200 may determine vehicle speed (travel speed) using the speed information. In some example embodiments, when a value of the vehicle speed is greater than or equal to a reference value, the controller 200 may determine a checking period as the first checking period. In some example embodiments, when the value of the vehicle speed is less than the reference value, the controller 200 may determine the checking period as a second checking period. Here, the first checking period may be shorter than the second checking period. In some example embodiments, the first checking period may correspond to verifying the signature value per each frame.

In some example embodiments, the controller 200 may calculate a period setting timing according to vehicle speed. Thereafter, the controller 200 may determine a checking period at a point in time at which the vehicle speed is changed. In some example embodiments, the controller 200 may verify a signature value of a frame per particular (or, alternatively, predetermined) mileage (e.g., per unit of distance, such as miles, travelled by the vehicle) regardless of the vehicle speed. In some example embodiments, the controller 200 may increase power consumption (e.g., power consumption of at least a portion of the image processing system 10, for example power consumption of the controller 200) corresponding to signature value verification with an increase in the vehicle speed.

Figure 11:
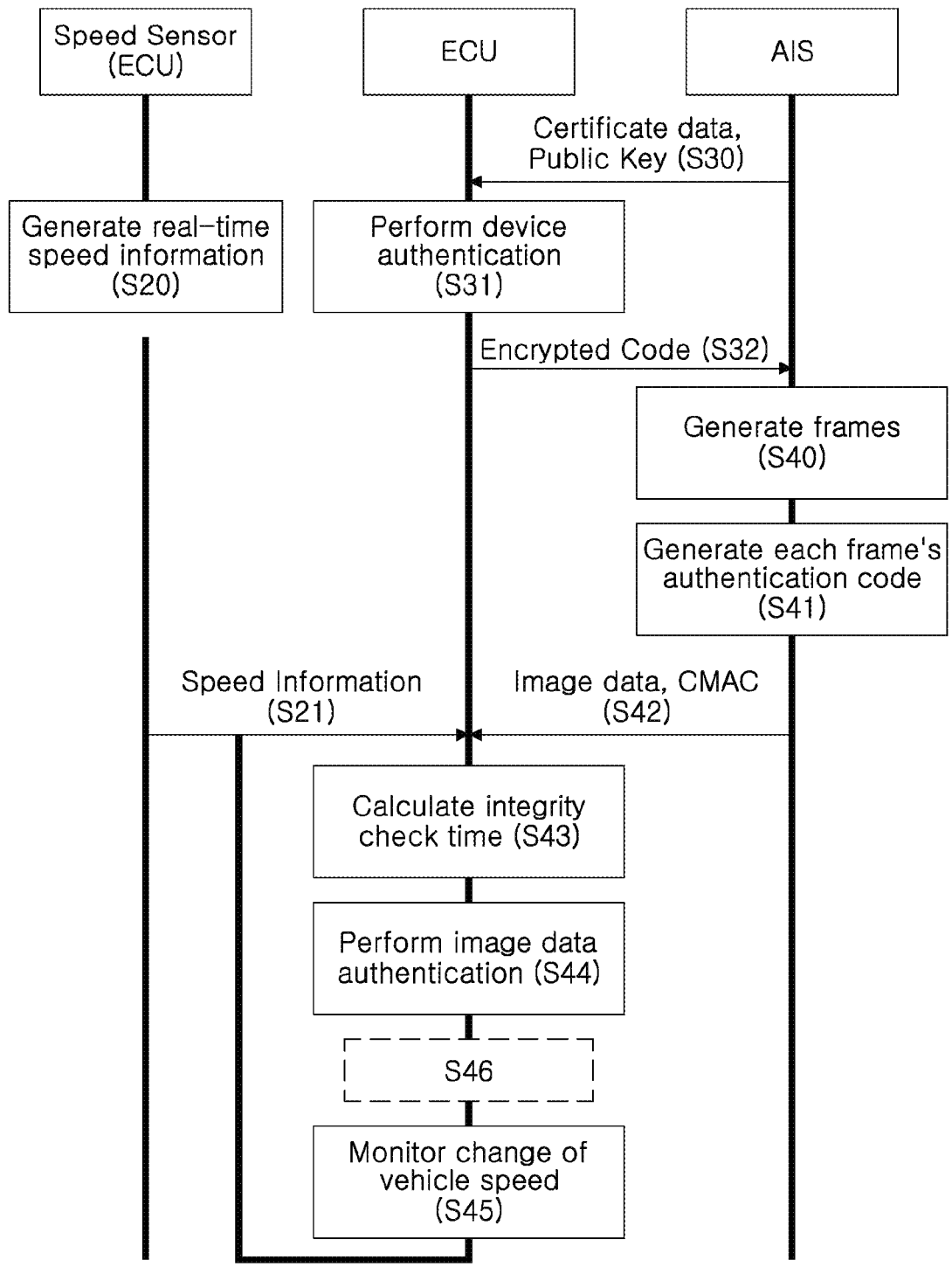
FIG. 11 is a ladder diagram illustrating an integrity check process of a vehicle control system according to some example embodiments of the present inventive concepts.

FIG. 11 is a ladder diagram illustrating an integrity check process of a vehicle control system included in a vehicle according to some example embodiments of the present inventive concepts. Referring to FIG. 11, the integrity check process of the vehicle control system may be performed as follows.

A speed sensor (or other ECUs) of the vehicle (e.g., an internal sensor 290 and/or external sensor 310) may generate vehicle speed information in real time (S20). The speed information may be transmitted to a vehicle controller (ECU) of the vehicle in real time (S21).

The vehicle controller (ECU) of the vehicle may receive, from an image sensor (AIS) of the vehicle, device authentication-related data and a public key after the image sensor (AIS) is reset (S30). The vehicle controller (ECU) may perform device authentication on the image sensor (AIS) using the device authentication-related data and the public key (S31). When the device authentication is successful, the vehicle controller (ECU) may transmit, to the image sensor (AIS), an encryption code having setting information for setting the image sensor (AIS) (e.g., encrypted setting information) (S32). Here, the encryption code may be transmitted via an I2C, MIPI, or SPI interface.

The image sensor (AIS) may decrypt the received encryption code using a private key, and check the setting information from a decrypted value. The image sensor (AIS) may be set according to the setting information. For example, the image sensor (AIS) may determine a signature method according to the setting information. Thereafter, the image sensor (AIS) may generate successive frames (S40). The image sensor (AIS) may generate an authentication code (CMAC) of each frame according to the determined signature method (S41). The image sensor (AIS) may output image data (frame) and authentication code (CMAC) to the vehicle controller (ECU) (S42). In this case, the image data and the authentication code (CMAC) may be transmitted via the MIPI interface.

The vehicle controller (ECU) may determine an integrity check point in time using the speed information received from the speed sensor (S43). Thereafter, the vehicle controller (ECU) may determine an integrity checking period and perform image data authentication (S44). That is, the vehicle controller (ECU) may check the authentication code (CMAC) of the received image data according to the determined integrity checking period. At S46, the vehicle controller (ECU) may analyze the image data that is authenticated at S44 to determine a state of the external ambient environment that is external to the vehicle (e.g., interpret a current traffic condition and an obstacle based thereon), and then execute device control for a subsequent operation (e.g., driving operation) in real time. Such device control may include the vehicle controller (ECU) adjustably controlling one or more driving controls 320 as shown in FIG. 12 (e.g., steering control, brake control, throttle control, etc.) of a vehicle in which the vehicle controller (ECU) is located (e.g., autonomous vehicle 3000), to drive the vehicle through an external ambient environment, based on processing the authenticated image data. Thereafter, the vehicle controller (ECU) may monitor a change (variation) in the vehicle speed and feed back to operation S21 (S45).

FIG. 12 is a diagram illustrating an autonomous vehicle 3000 according to some example embodiments of the present inventive concepts. Referring to FIG. 12, a front view camera 3100, a rear view camera 3200, and surround view cameras 3300 and 3400 may be implemented as the image sensors described with reference to FIGS. 1 to 11 (e.g., image sensor(s) 100 of an image processing system 10 and/or sensor(s) 21 of a vehicle control system 20). In addition, data of at least one of a side sensing camera, a driver monitoring camera, and an electronic mirror may be verified by the controller described with reference to FIGS. 1 to 11 (e.g., controller(s) 200 of an image processing system 10 and/or controller(s) 22 of a vehicle control system 20). In addition, the autonomous vehicle 3000 may include one or more driving controls 320 (e.g., steering control, brake control, throttle control, etc.) which may be controlled by a controller 200 and/or controller 20 to drive the autonomous vehicle 3000 through an external ambient environment, based on processing image data received from one or more image sensors 100 and/or 21, which may include one or more of the front view camera 3100, the rear view camera 3200, and the surround view cameras 3300 and 3400.

Figure 13:
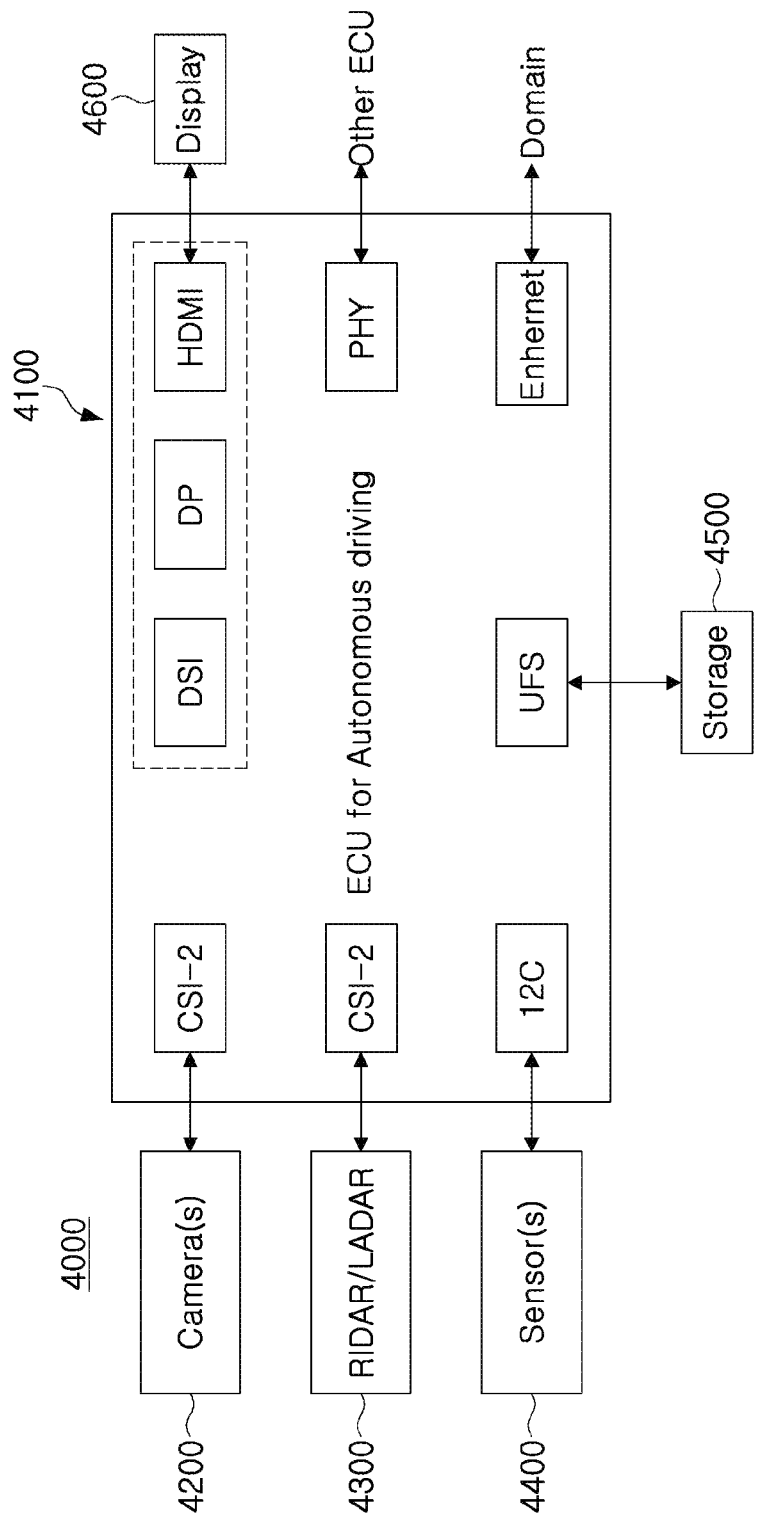
FIG. 13 is an example diagram illustrating a vehicle controller 4000 according to some example embodiments of the present inventive concepts.

FIG. 13 is an example diagram illustrating a vehicle controller 4000 according to some example embodiments of the present inventive concepts. Referring to FIG. 13, the vehicle controller 4000 may include an ECU 4100, at least one camera 4200, a lidar/radar 4300, at least one sensor 4400, a storage device 4500, and a display device 4600. In some example embodiments, the vehicle controller 4000 may be configured to implement a controller 200 of an image processing system 10, a controller 22 of a vehicle control system 20, or the like.

The ECU 4100 may be connected to the at least one camera 4200 and the lidar/radar 4300 via a CSI-2 interface. The at least one camera 4200 and/or the lidar/radar 4300 may be configured to implement an image sensor 100 of an image processing system 10, a sensor 21 of a vehicle control system 20, or the like. The at least one sensor 4400 may be configured to implement an internal sensor 290 and/or an external sensor 310 according to some example embodiments. Here, the camera 4200 and the lidar/radar 4300 may perform secure communication with the ECU 4100, as described with reference to FIGS. 1 to 13. The ECU 4100 may be connected to the at least one sensor 4400 via an I2C interface. The ECU 4100 may be connected to the storage device 4500 via a universal flash storage (UFS) interface. The ECU 4100 may be connected to the display device 4600 via a display interface such as a high definition multimedia interface (HDMI), a display serial interface (DSI), an embedded display port (eDP), or the like. The ECU 4100 may be connected to other ECUs via a MIPI A-PHY interface. It should be understood that the present inventive concepts are not limited to the MIPI A-PHY interface. The ECU 4100 may be connected to other ECUs via an MIPI C-PHY/D-PHY/M-PHY interface. The ECU 4100 may be connected to other domains within a vehicle via an Ethernet interface. It should be understood that the present inventive concepts are not limited to the Ethernet interface. The ECU 4100 may be connected to other domains via various vehicle communication interfaces (CAN, CAN-FD, LIN, FlexRay, and the like).

As described herein, any devices, electronic devices, modules, units, circuits, and/or portions thereof according to any of the example embodiments, and/or any portions thereof (including, without limitation, the image processing system 10, the image sensor 100, the image sensing unit 110, the signal processing unit 120, the security circuit 130, the interface circuit 140, the controller 200, the vehicle speed determiner 210, the checking period controller 220, the integrity check executor 230, the vehicle control system 20, the at least one sensor 21, the controller 22, the autonomous vehicle 3000, the front view camera 3100, the rear view camera 3200, the surround view cameras 3300 and 3400, the vehicle controller 4000, the ECU 4100, the at least one camera 4200, the lidar/radar 4300, the at least one sensor 4400, the storage device 4500, the display device 4600, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., a CPU) configured to execute the program of instructions to implement the functionality and/or methods performed by some or all of any devices, electronic devices, modules, units, circuits, and/or portions thereof, according to any of the example embodiments, including any of the methods according to any of the example embodiments.

Any of the memories described herein may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

While some example embodiments have been shown and described above, it will be apparent to those skilled in the art that modifications and variations could be made without departing from the scope of the present inventive concepts as defined by the appended claims.

What is claimed is:

1. An operating method of a controller for processing image data, the method comprising:
   receiving, from an image sensor, image data having successive frames and a signature value of the image data; and
   verifying the signature value of the image data using a vehicle speed,
   wherein the verifying the signature value of the image data includes
      determining a checking period according to the vehicle speed, and
      verifying a signature value of a frame determined from among the successive frames according to the checking period.

2. The method of claim 1, wherein the signature value of the image date is generated in the image sensor to correspond to each frame of the successive frames.

3. The method of claim 1, further comprising:
   encrypting setting information for generating the signature value of the image data in each frame of the successive frames; and
   transmitting the encrypted setting information to the image sensor.

4. The method of claim 1, further comprising:
   receiving speed information from an external sensor; and
   determining the vehicle speed using the speed information.

5. The method of claim 1, wherein
   the determining the checking period includes
      determining the checking period as a first checking period, in response to a determination that the vehicle speed is greater than or equal to a reference value, and
      determining the checking period as a second checking period, in response to a determination that the vehicle speed is less than the reference value, and
   the first checking period is shorter than the second checking period.

6. The method of claim 5, wherein the first checking period corresponds to verifying the signature value of the image data per each frame of the successive frames.

7. The method of claim 1, further comprising:
calculating a period setting timing according to the vehicle speed.

8. The method of claim 1, wherein the determining the checking period includes determining the checking period at which the vehicle speed is changed.

9. The method of claim 1, wherein power consumption of the controller corresponding to the verifying the signature value increases with an increase in the vehicle speed.

10. A controller for processing image data, the controller comprising:
a memory storing a program of instructions; and
a processor configured to execute the program of instructions to
receive speed information from an external sensor and to determine a vehicle speed based on the speed information,
determine an integrity checking period corresponding to the vehicle speed, and
verify integrity of a frame received from an image sensor according to the integrity checking period.

11. The controller of claim 10, wherein the processor is configured to execute the program of instructions to determine an integrity check timing according to the vehicle speed.

12. The controller of claim 11, wherein the processor is configured to execute the program of instructions to determine the integrity checking period corresponding to the vehicle speed at the integrity check timing.

13. The controller of claim 10, wherein the processor is configured to execute the program of instructions to
determine a first checking period as the integrity checking period, in response to a determination that a value of the vehicle speed is greater than or equal to a reference value, and
determine a second checking period different from the first checking period as the integrity checking period, in response to a determination that the value of the vehicle speed is less than the reference value.

14. The controller of claim 10, wherein the processor is configured to execute the program of instructions to not perform an integrity check per frame at a particular interval according to the vehicle speed.

15. An image processing system, comprising:
an image sensor configured to
acquire image data,
generate a signature value corresponding to the image data, and
output the image data and the signature value as secured image data via a first communication interface; and
a controller configured to
receive the secured image data from the image sensor, and
verify the signature value according to a checking period corresponding to a vehicle speed.

16. The image processing system of claim 15, wherein the controller is configured to
encrypt setting information related to a method of generating the signature value; and
transmit the encrypted setting information to the image sensor via a second communication interface.

17. The image processing system of claim 16, wherein
the first communication interface is a MIPI (Mobile Industry Processor Interface) interface, and
the second communication interface is an I2C (Inter Integrated Circuit) interface.

18. The image processing system of claim 15, wherein the controller is configured to verify the signature value per frame, in response to a determination that the vehicle speed is greater than or equal to a reference value.

19. The image processing system of claim 15, wherein the controller is configured to verify the signature value per frame at a particular interval, in response to a determination that a value of the vehicle speed is less than a reference value.

* * * * *